United States Patent [19]
Wolcott

[11] Patent Number: 5,771,810
[45] Date of Patent: Jun. 30, 1998

[54] CONTINUOUS TONE MICROFLUIDIC DISPLAY AND PRINTING

[75] Inventor: Dana W. Wolcott, Honeoye Falls, N.Y.

[73] Assignee: Eastman Kodak Company, Rochester, N.Y.

[21] Appl. No.: 882,620

[22] Filed: Jun. 25, 1997

[51] Int. Cl.⁶ .............................. B41J 13/02; B41J 2/165
[52] U.S. Cl. .................................. 101/483; 347/3; 347/6; 347/43
[58] Field of Search .................................. 101/483, 211, 101/491; 347/115, 117, 153, 172, 2, 3, 6, 7, 15, 43, 85, 90

[56] References Cited

U.S. PATENT DOCUMENTS

| 4,614,953 | 9/1986 | Lapeyre | 347/43 |
| 4,614,967 | 9/1986 | Sayanagi | 347/43 |
| 4,967,203 | 10/1990 | Doan et al. | 347/43 |
| 4,987,429 | 1/1991 | Finley et al. | 347/43 |
| 5,016,097 | 5/1991 | Sitimano | 347/3 |
| 5,315,404 | 5/1994 | Kuboui et al. | 347/3 |
| 5,345,315 | 9/1994 | Shalit | 347/3 |
| 5,355,159 | 10/1994 | Kaneno | 347/3 |
| 5,376,957 | 12/1994 | Gandy et al. | 347/3 |
| 5,400,062 | 3/1995 | Salmon | 347/6 |
| 5,585,069 | 12/1996 | Zanzucchi et al. | |
| 5,593,838 | 1/1997 | Zanzucchi et al. | |
| 5,603,351 | 2/1997 | Cherukuri et al. | |
| 5,605,750 | 2/1997 | Romano et al. | |
| 5,606,351 | 2/1997 | Hawkins | |
| 5,611,028 | 3/1997 | Shibasakl et al. | 347/3 |
| 5,611,847 | 3/1997 | Guistina et al. | |
| 5,646,656 | 7/1997 | Leonhardt et al. | 347/43 |
| 5,713,062 | 4/1998 | Goodman et al. | 430/117 |

OTHER PUBLICATIONS

"Electroosmosis: A Reliable Fluid Propulsion System for Flow Injection Analysis", Anal. Chem. 66, pp. 1792–1798 (1994).

Primary Examiner—Eugene H. Eickholt
Attorney, Agent, or Firm—Raymond L. Owens

[57] ABSTRACT

A method for microfluidic display and printing includes the steps of: providing colored inks needed for printing colored pixels; pumping the colored inks through capillary microchannels into delivery chambers where the colored inks are mixed to provide a desired color for each pixel, having the correct hue and tone scale; arranging the delivery chambers so as to provide a viewable representation of the image prior to printing; and evacuating the delivery chambers when it is not desired to print an image and moving a receiver into engagement with the delivery chambers when it is desired to print an image for transferring colored ink to a reflective receiver to thereby form an image having colored pixels.

6 Claims, 2 Drawing Sheets

CONTINUOUS TONE MICROFLUIDIC DISPLAY AND PRINTING

CROSS REFERENCE TO RELATED APPLICATIONS

Reference is made to commonly assigned U.S. patent application Ser. Nos. 08/699,955 filed Aug. 20, 1996 now U.S. Pat. No. 5,679,139, entitled "Cyan and Magenta Pigment Set"; 08/699,962 filed Aug. 20, 1996 now U.S. Pat. No. 5,679,141, entitled "Magenta Ink Jet Pigment Set"; 08/699, 963 filed Aug. 20, 1996 now U.S. Pat. No. 5,679,142, entitled "Cyan Ink Jet Pigment Set", all by McInerney, Oldfield, Bugner, Bermel and Santilli, and to commonly assigned U.S. patent application Ser. No. 08/790,131 filed Jan. 29, 1997 now U.S. Pat. No. 5,698,018 entitled "Heat Transferring Ink Jet Images", by Bishop, Simons and Brick, and to commonly assigned U.S. patent application Ser. No. 08/764,379 filed Dec. 13, 1996, entitled "Pigmented Inkjet Inks Containing Phosphated Ester Derivatives", by Martin, the disclosures of which are incorporated herein by reference.

FIELD OF THE INVENTION

The present invention relates to microfluidic ink printing, and more particularly, to displaying a colored ink image for review prior to printing and then printing a colored image by microfluidic pumping of colored inks.

BACKGROUND OF THE INVENTION

Microfluidic pumping and dispensing of liquid chemical reagents is the subject of three U.S. Pat. Nos. 5,585,069, 5,593,838, and 5,603,351, all assigned to the David Sarnoff Research Center, Inc., and hereby incorporated by reference. The system uses an array of micron sized reservoirs, with connecting microchannels and reaction cells etched into a substrate. Electrokinetic pumps comprising electrically activated electrodes within the capillary microchannels provide the propulsive forces to move the liquid reagents within the system. The electrokinetic pump, which is also known as an electroosmotic pump, has been disclosed by Dasgupta et al., see "Electroosmosis: A Reliable Fluid Propulsion System for Flow Injection Analyses", Anal. Chem. 66, pp 1792–1798 (1994). The chemical reagent solutions are pumped from a reservoir, mixed in controlled amounts, and them pumped into a bottom array of reaction cells. The array may be decoupled from the assembly and removed for incubation or analysis. When used as a printing device, the chemical reagent solutions are replaced by dispersions of cyan, magenta, and yellow pigment, and the array of reaction cells may be considered a viewable display of picture elements, or pixels, comprising mixtures of pigments having the hue of the pixel in the original scene. When contacted with paper, the capillary force of the paper fibers pulls the dye from the cells and holds it in the paper, thus producing a paper print, or photograph, of the original scene. One problem with this kind of printer is the rendering of an accurate tone scale. The problem comes about because the capillary force of the paper fibers remove all the pigment solution from the cell, draining it empty. If, for example, a yellow pixel is being printed, the density of the image will be fully yellow. However, in some scenes, a light, or pale yellow is the original scene color. One way to solve this problem might be to stock and pump a number of yellow pigments ranging from very light to dark yellow. Another way to solve the tone scale problem is to print a very small dot of dark yellow and leave white paper surrounding the dot. The human eye will integrate the white and the small dot of dark yellow leading to an impression of light yellow, provided the dot is small enough. This is the principle upon which the art of color halftone lithographic printing rests. It is sometimes referred to as area modulation of tone scale. However, in order to provide a full tone scale of colors, a high resolution printer is required, with many more dots per inch than would be required if the colors could be printed at different densities. Another solution to the tone scale problem has been provided in the area of ink jet printers, as described in U.S. Pat. No. 5,606,351, by Gilbert A. Hawkins, hereby incorporated by reference. In an ink jet printer, the drop size is determined primarily by the surface tension of the ink and the size of the orifice from which the drop is ejected. The ink jet printer thus has a similar problem with rendition of tone scale. The Hawkins patent overcomes the problem by premixing the colored ink with a colorless ink in the correct proportions to produce a drop of ink of the correct intensity to render tone scale. However, ink jet printers require a relatively high level of power to function, and they tend to be slow since only a few pixels are printed at a time (serial printing), in comparison to the microfluidic printer in which all the pixels are printed simultaneously (parallel printing). Also, displays for viewing the image before printing, i.e. LCDs, CRTs, require cost and power that make incorporating them in a portable device impractical.

SUMMARY OF THE INVENTION

It is an object of the present invention to provide a compact, low powered display/printer which permits rapidly reviewing and selectively printing a high quality continuous tone image.

Another object of this invention is to provide an rapid way to review and selectively print a high quality ink image.

Another object of this invention is to provide a compact, low power, portable display/printer.

These objects are achieved by a method for microfluidic display and printing comprises the steps of:

(a) providing colored inks needed for printing colored pixels;

(b) pumping the colored inks through capillary microchannels into delivery chambers where the colored inks are mixed to provide a desired color for each pixel, having the correct hue and tone scale;

(c) arranging the delivery chambers so as to provide a viewable representation of the image prior to printing; and (d) evacuating the delivery chambers when it is not desired to print an image and moving a receiver into engagement with the delivery chambers when it is desired to print an image for transferring colored ink to a reflective receiver to thereby form an image having colored pixels.

The present invention permits a preview of an image prior to printing and an effective time saving way for removing ink from the delivery chambers. When the desired image is viewed by a user a high quality continuous tone print can be made.

Another feature of the invention is that the display/printer in accordance with the present invention requires low power, compact and portable.

A further feature of the invention is that the printing process is fast, because all the pixels are printed simultaneously.

A still further feature of the invention is that registration errors, banding and other positional error defects are greatly reduced because all the pixels are printed simultaneously.

Another feature of the invention is that it permits review and confirmation prior to printing such image.

DETAILED DESCRIPTION OF THE PREFERRED EMBODIMENTS

The present invention is particularly applicable with computer generated images, graphic images, line art, text images and the like.

Figure 1:
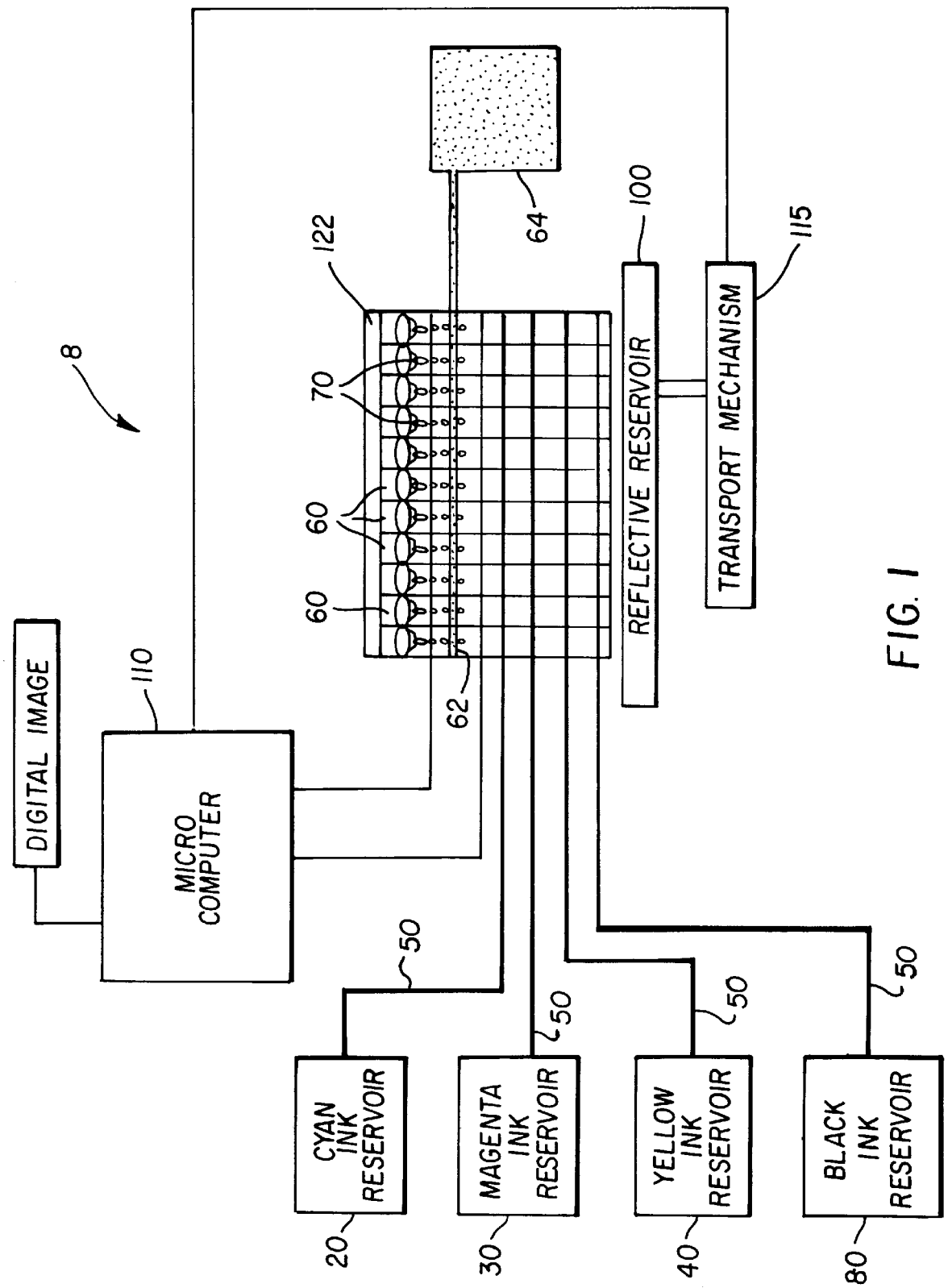
FIG. 1 is a partial schematic view showing an apparatus for pumping, mixing and printing pixels of ink onto a reflective receiver which can practice the method of the present invention.

Referring to FIG. 1, a schematic diagram is shown of the method of printing. Reservoirs are shown for cyan ink 20, magenta ink 30, and yellow ink 40. There may be included an optional reservoir 80 for black ink. Microchannel capillaries 50 are shown to conduct the ink from the reservoir to the ink pixel delivery chambers 60. The amount of each color ink is controlled by electrokinetic valves 70. Similar valves are used for the other color channels, but these are omitted from the figure for clarity. Finally, a reflective receiver 100 is shown to accept the ink and thereby produce the print.

Figure 2:
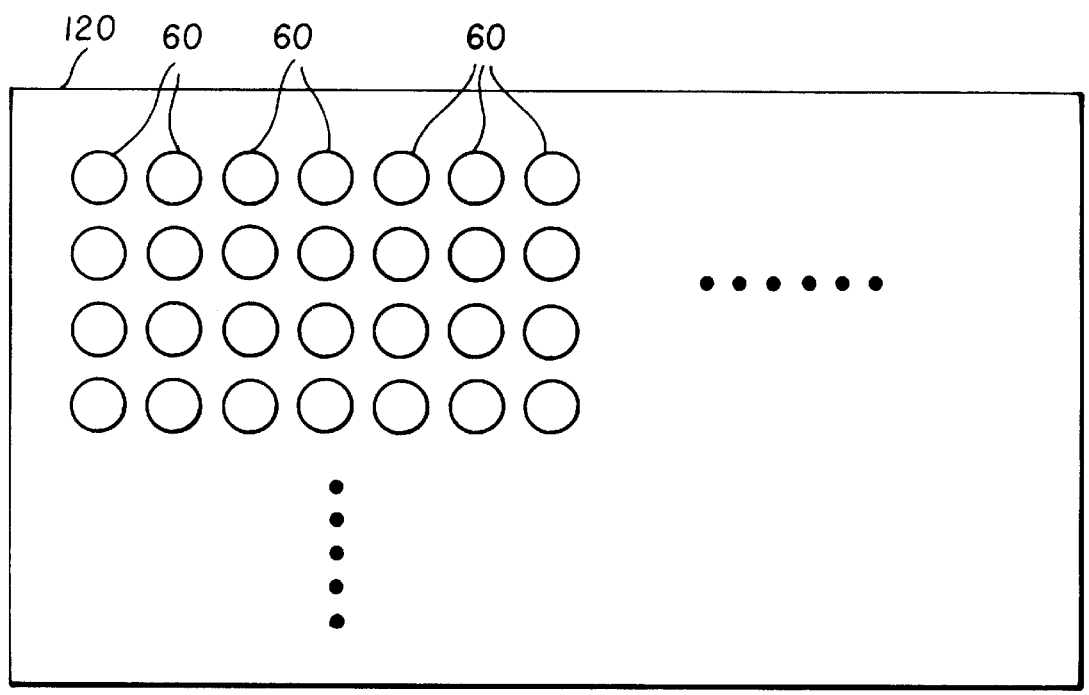
FIG. 2 is a top view of a pattern of the color pixels held in the ink delivery chambers in the apparatus of FIG. 1.

FIG. 2 is a top view which depicts an array of delivery chambers 60 each already containing mixed ink. When a viewer views this arrangement, a colored image is observed. As will be described further, when it is desired to print such colored image a reflective receiver is brought into engagement with the delivery chambers 60 and the colored inks in such delivery chambers 60 are transferred to a reflective receiver 100 (FIG. 1). On top of the delivery chambers 60 there is provided a transparent substrate 122 which permits direct viewing of the array of delivery chambers 60 to provide a visual image prior to printing. It will be understood that the transparent substrate 122 may also provide the structure for mounting the electrokinetic pumps 70. The microchannels 50, however, can be directly in the transparent substrate 122. When the delivery chambers 60 are filled with the mixed colored inks that represent the image to be printed the image can be viewed prior to printing. Each ink delivery chamber 60 is capable of producing a mixture of ink having any color saturation, hue and lightness within the color gamut provided by the set of inks used in the apparatus. This results in a continuous tone image for display. If the image is of a high quality, then a receiver 100 is moved by a transport mechanism 115 into engagement with open ends of the delivery chambers 60.

The inks used in this invention are dispersions of colorants in common solvents. Examples of such inks may be found is U.S. Pat. No. 5,611,847 by Gustina, Santilli and Bugner. Inks may also be found in the following commonly assigned U.S. patent application Ser. Nos. 08/699,955; 08/699,962; and 08/699,963 by McInerney, Oldfield, Bugner, Bermel and Santilli, and in U.S. patent application Ser. No. 08/790,131 by Bishop, Simons and Brick, and in U.S. patent application Ser. No. 08/764,379 by Martin. In a preferred embodiment of the invention the solvent is water. Colorants such as the Ciba Geigy Unisperse Rubine 4BA-PA, Unisperse Yellow RT-PA, and Unisperse Blue GT-PA are also preferred embodiments of the invention.

The microchannel capillaries, ink pixel delivery chambers and electrokinetic pumps are all fully described in the Sarnoff patents listed above.

The reflective receiver 100 may be common paper having sufficient fibers to provide a capillary force to draw the ink from the delivery chambers into the paper. Synthetic papers may also be used. The receiver may have a coated layer of polymer which has a strong affinity, or mordanting effect for the ink. For example, if a water based ink is used, a layer of gelatin will provide an absorbing layer for the ink. In a preferred embodiment of the invention, the reflective receiver is that disclosed in U.S. Pat. No. 5,605,750, by Romano, Bugner and Ferrar.

The typical printing operation in the present invention involves the following steps. First the printer receives a digital image file consisting of electronic signals in which the color code values are characterized by bit depths of an essentially continuous tone image, for example, 8 bits per color per pixel. Based on the color code values at each pixel, which define the lightness, hue and color saturation at the pixel, the electrokinetic pumps at the corresponding pixel pump the designated cyan, magenta, yellow and clear ink in an amount corresponding to the code value from the ink reservoirs 20, 30, 40 and 80, into the pixel delivery chamber 60. The mixture of inks, which has the same hue, lightness and color saturation as the corresponding pixel of the original image being printed, is held in the delivery chamber by the surface tension of the ink. At this point the image to be printed can be viewed directly. If it is not desired to print the image, the mixed colored inks should be evacuated from the delivery chambers 60. As shown in FIG. 1, each of the delivery chambers 60 includes an evacuation port 62 in each delivery chambers 60. The evacuation port 62 includes a member which can be moved to an opened position under the control of the microcomputer 110 and ink is evacuated from each delivery chamber 60 to a used ink reservoir 64. Alternatively, an ink receiving blotter could be moved into contact with the open ends of the delivery chambers 60 thereby evacuating such delivery chambers 60 of ink. In any event, the delivery chambers 60 should be evacuated and another image formed by a new mixing process to provide a desired colored image. This process can be iterative until the desired image is viewed. When the desired image is viewed, the reflective receiver 100 is subsequently placed in contact with the ink meniscus of the ink delivery chamber 60 within the printer front plate 120. The mixture of inks contained in the delivery chamber 60 is then drawn into the reflective receiver by the capillary force of the paper fibers, or by the absorbing or mordanting force of the polymeric layer coated on the reflective receiver. One important advantage of the present invention is the reduction of the printing image defects that commonly occur when the cyan, magenta and yellow inks are printed in separate operations. Misregistration of the apparatus often leads to visible misregistration of the color planes being printed. In this invention, all the color planes are printed simultaneously, thus eliminating such misregistration.

Ink from the black ink reservoir 80 may be included in the colored in mixtures to improve the density of dark areas of the print, or may be used alone to print text, or line art, if such is included in the image being printed.

The invention has been described in detail with particular reference to certain preferred embodiments thereof, but it will be understood that variations and modifications can be effected within the spirit and scope of the invention.

PARTS LIST

20 Cyan Ink Reservoir

30 Magenta Ink Reservoir

40 Yellow Ink Reservoir

50 Microchannel Capillaries
60 Ink Pixel Delivery Chambers
62 Evacuation Port
64 Used Ink Reservoir
70 Electrokinetic Pumps
80 Black Ink Reservoir
100 Reflective Receiver
110 Microcomputer
120 Printer Front Plate
122 Transparent Substrate

What is claimed is:

1. A method for microfluidic display and printing comprises the steps of:
   (a) providing colored inks needed for printing colored pixels;
   (b) pumping the colored inks through capillary microchannels into delivery chambers where the colored inks are mixed to provide a desired color for each pixel, having the correct hue and tone scale;
   (c) arranging the delivery chambers so as to provide a viewable representation of the image prior to printing; and
   (d) evacuating the delivery chambers when it is not desired to print an image and moving a receiver into engagement with the delivery chambers when it is desired to print an image for transferring colored ink to a reflective receiver to thereby form an image having colored pixels.

2. The method of claim 1 wherein the colored inks are cyan, magenta and yellow and a computed amount of each ink is delivered to the delivery chambers where the inks are mixed to provide continuous tone ink pixels.

3. The method of claim 1 wherein the colored inks include black ink.

4. The method of claim 1 wherein the colored inks include an ink solvent, cyan, magenta, yellow and black inks.

5. The method of claim 1 wherein the colored pixels of mixed ink are simultaneously transferred to the reflective receiver.

6. A method for microfluidic display and printing comprises the steps of:
   (a) providing reservoirs with colored inks for printing colored pixels and a used ink reservoir;
   (b) pumping the colored inks from the colored ink reservoirs through capillary microchannels into delivery chambers where the colored inks are mixed to provide a desired color for each pixel, having the correct hue and tone scale;
   (c) arranging the delivery chambers so as to provide a viewable representation of the image prior to printing; and
   (d) evacuating the delivery chambers when it is not desired to print an image by delivering ink from the delivery chambers to the used ink reservoir and moving a receiver into engagement with the delivery chambers when it is desired to print an image for transferring colored ink to a reflective receiver to thereby form an image having colored pixels.

* * * * *

IN THE UNITED STATES PATENT AND TRADEMARK OFFICE
CERTIFICATE OF CORRECTION

PATENT NO.: 5,771,810
DATED: 30 June 1998
INVENTOR(S): Wolcott

It is certified that an error appears in the above-identified patent and that said Letters Patent is hereby corrected as shown below:

Column 3, line 22    "valves" should read -- pumps --

Signed and Sealed this

Sixteenth Day of January, 2001

Attest:

Q. TODD DICKINSON

*Attesting Officer*    *Commissioner of Patents and Trademarks*